June 18, 1968   G. DUPLESSIS   3,388,488
BUCKET AND ADAPTER ASSEMBLY FOR DIGGING TEETH
Filed Nov. 29, 1965   2 Sheets-Sheet 1
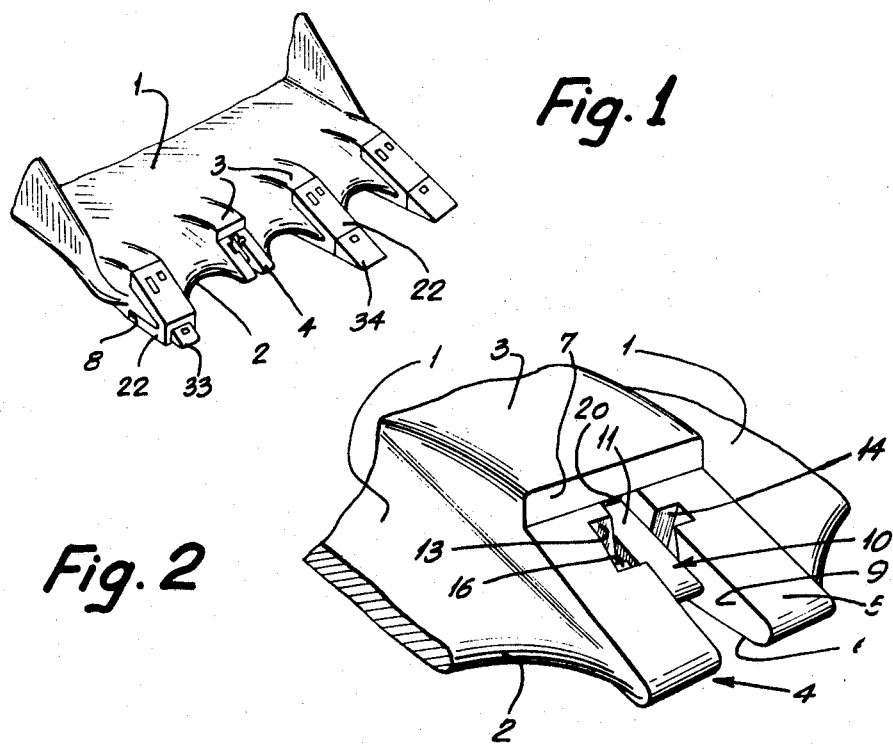
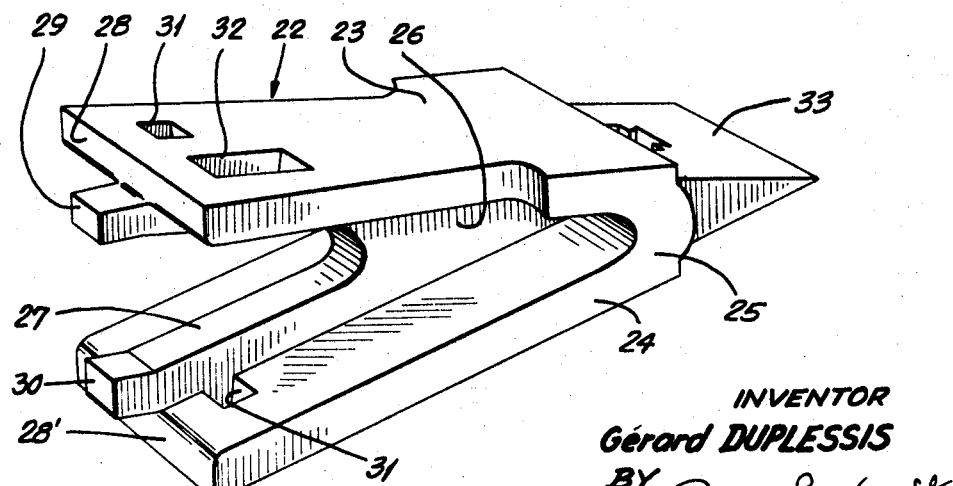
INVENTOR
Gérard DUPLESSIS
BY Pierre Lespérance
PATENT AGENT INVENTOR
Gérard DUPLESSIS
BY
*Pierre Lespérance*

PATENT AGENT

United States Patent Office 3,388,488
Patented June 18, 1968

3,388,488
BUCKET AND ADAPTOR ASSEMBLY FOR DIGGING TEETH
Gérard Duplessis, 10806 St. Denis St., Montreal, Quebec, Canada
Filed Nov. 29, 1965, Ser. No. 510,221
6 Claims. (Cl. 37—142)

The present invention relates to buckets or dippers of power shovels and the like and, more particularly, to a structure for assembling two parts excavating teeth on the lip of the bucket.

It is known to provide excavating teeth made of two parts, namely: a tooth point and an adaptor on which the tooth point is fitted, said adaptor in turn being removably secured to the lip of the bucket. With conventional lip and adaptor structures, excessive play develops between the adaptor and bucket lip during use, resulting in a rapid wearing of the adaptor and lip, or the adaptor is so firmly wedged in position on the lip that it is nearly impossible to remove the adaptor from the lip when it is desired to replace a broken or worn-out adaptor.

It is therefore the general object of the present invention to provide a lip and adaptor assembly which permits relatively easy removal of the adaptor from the lip at any time, and which yet firmly secures the adaptor on the lip so as to prevent any play between these two elements, even after prolonged rough usage.

Another object of the present invention resides in the provision of an adaptor structure which is very strong and will not become deformed under abuse and which yet is of relatively light weight construction.

Another object of the present invention resides in the provision of an adaptor and lip structure of the character described, in which the lip provides a tapered nose and the adaptor provides tapering surfaces wedged on the nose by elastic forces which exert a balanced action on the adaptor to thereby maintain a close fitting of the adaptor on the lip nose at all times and despite angularly directed thrust exerted on the adaptor during digging and the like.

The foregoing and other important objects of the present invention will become more apparent during the following disclosure and by referring to the drawings, in which:

FIGURE 1 is a perspective partial view of a bucket lip showing a bare lip nose, an adaptor fitted on a lip nose, and adaptors and tooth points fitted on the remaining lip noses;

FIGURE 2 is a partial perspective view of the bucket lip, on an enlarged scale, showing the lip nose;

FIGURE 3 is a perspective view of the adaptor;

Figure 4:
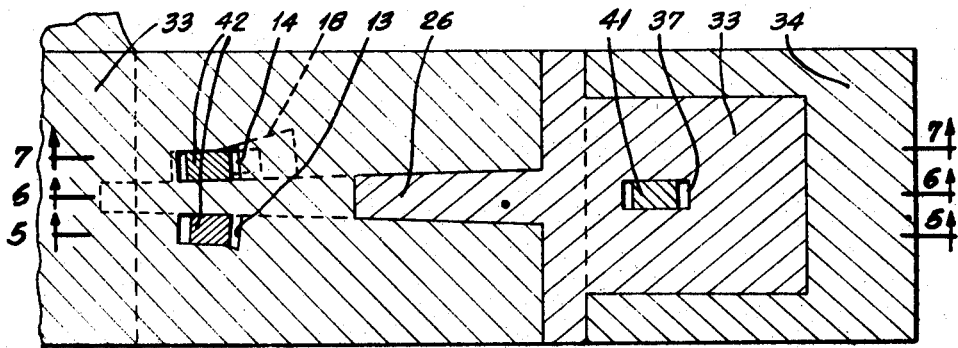
FIGURE 4 is a plan section of the assembly of lip, adaptor and tooth point.
Figure 5:
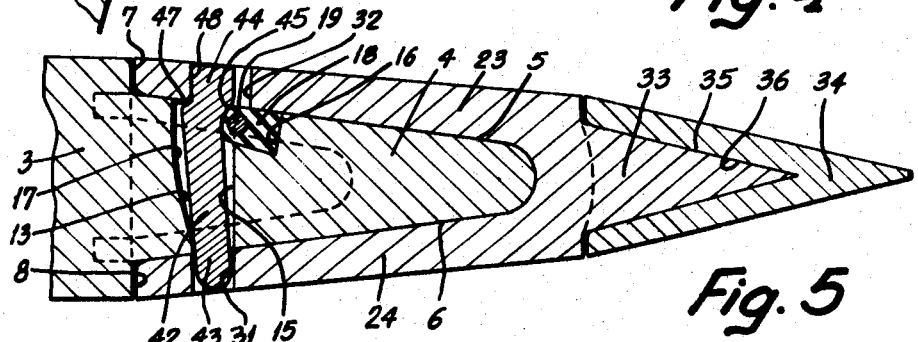
FIGURE 5 is a longitudinal section, taken along line 5—5 of FIGURE 4.
Figure 6:
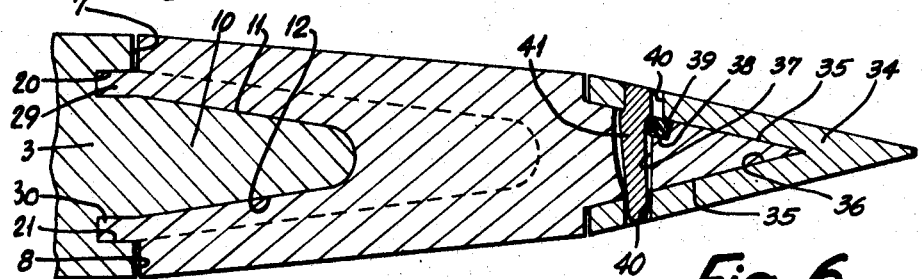
FIGURE 6 is a longitudinal section, taken along line 6—6 of FIGURE 4.
Figure 7:
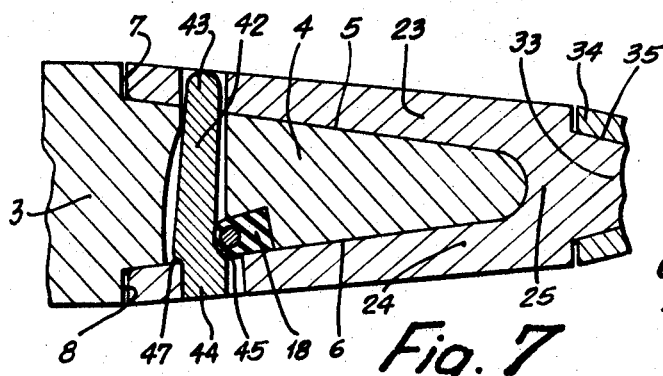
FIGURE 7 is a partial longitudinal section, taken along line 7—7 of FIGURE 4.

Referring now more particularly to the drawings in which like reference characters indicate like elements throughout, reference numeral 1 indicates a bucket lip having a tapered working edge 2 and provided at spaced locations therealong with thickened portions 3 defining a forwardly extending tapered nose 4.

Nose 4 is defined by forwardly converging top and bottom substantially flat faces 5 and 6 joining with the thickened portion 3 at the back thereof by means of top and bottom shoulders 7 and 8 respectively.

The nose 4 is provided with a vertical central slot 9 opening at the top and bottom faces 5 and 6 and the front of the nose. The bottom of the slot 9, that is the portion of said slot adjacent shoulders 7 and 8, is filled by a wedge portion 10 bridging the slot and forwardly tapered and having its converging top and bottom faces 11 and 12 substantially parallel, but recessed with respect to the top and bottom faces 5 and 6 of nose 4.

Nose 4 is further provided with transversely extending holes 13 and 14 opening at the top and bottom faces 5 and 6 and located on each side of wedge 10. Each hole 13 and 14 has a similar shape, but is in relative upside down position. Each hole has flat lateral faces and a flat front face 15 terminating short of one of the faces 5 and 6 to define a recess 16 therewith. Each hole 13 and 14 furthermore has a back face 17 which is curved to become progressively more distant from front face 15 as it approaches an area directly opposite recess 16.

A resilient block 18, of rubber or other compressible material, is fitted within the recess 16 and normally extends within hole 13 or 14. A short steel cylinder 19 is preferably embedded within block 18 at its end protruding within hole 13 or 14.

Block 18 of one hole 13 is adjacent top face 5, while block 18 of the other hole 14 is adjacent bottom face 6.

Nose 4 is furthermore provided with cavities 20 and 21 extending underneath shoulders 7 and 8, respectively, just above the top and bottom faces 11 and 12 of wedge 10.

The adaptor in accordance with the invention is generally indicated at 22 and is arranged to be removably fitted over nose 4 of bucket lip 1. Adaptor 22 consists of two plate-like walls 23 and 24 converging forwardly to be joined together at 25 forming open sides and rigidly held together by means of a web 26 disposed centrally of the adaptor and joined to the inside faces of walls 23 and 24 along substantially the entire length thereof.

Web 26 is provided at its rear end with a deep notch 27 opening rearwardly and having a substantially V-shape to fit over wedge 10 of nose 4. The web 26 protrudes from the rear ends 28, 28' of walls 23 and 24 to form lugs 29 and 30 respectively, said lugs being slightly bent to extend substantially parallel to each other.

Walls 23 and 24 are further provided each with a pair of apertures 31 and 32 extending therethrough and disposed on each side of web 26 and adjacent the same, aperture 31 being the smaller one and substantially of square shape, while the larger aperture 32 is substantially rectangular in shape with its long axis substantially parallel to the long axis of the adaptor 22.

The smaller aperture 31 of wall 23 registers with the larger aperture 32 of wall 24 and, similarly, the larger aperture 33 of wall 23 registers with the smaller aperture 31 of wall 24.

The adaptor further includes a nose 33 protruding forwardly of the wall junction zone 25, said nose 33 adapted to removably receive in a standard manner a conventional tooth point 34. Nose 33 has forwardly converging faces 35 and is adapted to engage a tapered socket 36 made in the tooth point 34. The nose 33 is furthermore provided with a transverse hole 37, of a shape similar to holes 13 and 14, and provided at one end with a recess 38 in which is fitted a resilient block 39. The top and bottom walls of tooth point 34 are provided with apertures 40 adapted to register with hole 37, when tooth point 34 is fitted on nose 33, so as to receive a locking pin 41 which locks the tooth point 34 on nose 33 and is retained in position by means of resilient block 39.

When adaptor 22 is fitted on nose 4 of the bucket lip 1, its web 26 is inserted within slot 9 and the notch 27 of web 26 receives wedge 10 of nose 4.

Lugs 29 and 30 engage cavities 20 and 21 of nose 4 and the inside faces of walls 23 and 24 of the adaptor fit tightly over the top and bottom faces 5 and 6 of nose 4. In this position, apertures 31 and 32 on each side of web 26 are in register with the holes 13 and 14 on each side of wedge 19 of the nose.

Locking pins 42, of identical shape, are inserted within the two sets of registering apertures and holes on each side of web 26, the locking pins being inserted from the opposite faces 23 and 24 of the adaptor 22, so as to be in mutually reverse position.

Each locking pin 42 has a small end 43 adapted to extend across the smaller aperture 31, and a larger end 44 adapted to extend across the larger aperture 32 and abut against the rear face of said larger aperture 32 under the action of compression block 18.

Each locking pin 42 has furthermore at its front face a shoulder 45 facing towards the smaller end 43, while the back face of the locking pin forms a shoulder 47 facing towards the larger end 44 of the locking pin.

Shoulder 45 is engaged by the resilient block 18, while shoulder 47 engages the rear overhanging face 48 of the larger aperture 32. Thus, the locking pins 42, once in position, are prevented from moving in either axial direction. These locking pins have a shape and function similar to the locking pin described in copending patent application Ser. No. 307,094, filed Sept. 6, 1963, and entitled: "Digger Tooth Locking Pin."

It will be noted that the resilient blocks 18 exert on the locking pins 42 a force directed towards the rear, that is towards the bucket, at zones substantially equally distant over and below the medial plane of nose 4, whereby said pins in turn exert a balanced force on the adaptor 22, forcing the same with equal pressure on the top and bottom faces 5 and 6 of nose 4 of bucket lip 1.

This feature prevents the adaptor from working itself loose on the nose 4, despite the very heavy angularly directed forces to which said adaptor is subjected in use.

Web 26 joining the two walls 23 and 24 of the adaptor at the middle thereof result in a very strong adaptor and will positively prevent any deformation or opening of the two walls 23 and 24 under rough usage. Web 26 also resists lateral displacement of the adaptor 22 on nose 4.

Lugs 29 and 30 fitting underneath shoulders 7 and 8 prevent the notched portion of the web 26 and, consequently, the portions of the walls 23 and 24 overlying said notched portion from opening up under external forces. Thus, a very secure attachment of the adaptor on the bucket lip 1 is achieved and yet it is relatively easy to remove the locking pins 42 in order to replace the adaptor whenever desired, because said locking pins are not wedged in full metal-to-metal contact as in the conventional means for removably securing adaptors to a bucket lip, but are resiliently held by compression blocks 18, which can be compressed by pushing the larger end 44 of the locking pins 42 forwardly, to thereby clear shoulders 47 for retrieval of the locking pins, the latter being knocked out from their opposite smaller ends 42.

The adaptor in accordance with the invention can be fitted with any type of nose 33 to receive any type of tooth point 34 and locking pin 41, the present invention being particularly directed to the lip nose structure and to the adaptor structure adapted to fit said nose.

While a preferred embodiment in accordance with the invention has been illustrated and described, it is understood that various modifications may be resorted to without departing from the scope of the appended claims.

What I claim is:

1. A digging bucket lip and tooth adaptor removably carried thereby, said lip having a working edge and a plurality of adaptor-receiving forwardly tapered noses formed on said working edge at spaced locations therealong, each of said noses having a central slot, each of said noses further having a pair of transverse holes extending therethrough, a tooth adaptor removably fitted on said nose, said adaptor comprising a pair of diverging walls joined together at their forward ends, a tooth-receiving forwardly tapered nose protruding from said joined ends of said walls, a web centrally interconnecting said walls along substantially their entire lengths, said walls removably fitted over said adaptor-receiving nose with said adaptor web engaging said slot, said wall having apertures made therethrough on each side of said web, registering with said transverse holes of said adaptor-receiving nose, and locking pins removably inserted in said registering apertures and holes to lock said adaptor on said adaptor-receiving nose, and resilient blocks inserted in said holes and disposed forwardly of said pins and between said pins and adaptor-receiving nose to urge said pins and adaptor towards said lip.

2. A bucket lip and tooth adaptor assembly as claimed in claim 1, wherein said adaptor-receiving tapered nose has forwardly converging top and bottom flat faces, said holes each provided with a cavity forwardly of said holes, the cavity of one of said holes opening at said top face and the cavity of the other of said holes openings at said bottom face, said resilient blocks fitted in said cavities and engaging said locking pins above and below the median plane of said adaptor-receiving nose.

3. A bucket lip and tooth adaptor assembly as claimed in claim 2, wherein said web of said adaptor has a V-shaped notch opening at the rear end of said adaptor and said adaptor-receiving nose has a wedge in the back portion of said slot fitting within said notch.

4. A bucket lip and tooth adaptor assembly as claimed in claim 3, wherein said adaptor web forms lugs protruding rearwardly from said walls on each side of said web notch, and said adaptor-receiving nose has forwardly opening cavities receiving said lugs in fitting engagement.

5. A bucket lip and tooth adaptor assembly as claimed in claim 1, wherein said web of said adaptor has a V-shaped notch opening at the rear end of said adaptor and said adaptor-receiving nose has a wedge in the back portion of said slot fitting within said notch.

6. A bucket lip and tooth adaptor assembly as claimed in claim 5, wherein said adaptor web forms lugs protruding rearwardly from said walls on each side of said web notch, and said adaptor-receiving nose has forwardly opening cavities receiving said lugs in fitting engagement.

References Cited

UNITED STATES PATENTS

| | | | |
|---|---|---|---|
| 1,874,783 | 8/1932 | Mekeel | 37—142 |
| 2,339,128 | 1/1944 | Younie | 37—142 |
| 2,891,333 | 6/1959 | Van Buskirk | 37—142 |
| 2,987,838 | 6/1961 | Stratton | 37—142 |

ABRAHAM G. STONE, *Primary Examiner.*

R. C. HARRINGTON, *Assistant Examiner.*